(No Model.)
M. H. BARNARD.
Cattle Stanchion.
No. 236,479. Patented Jan. 11, 1881.
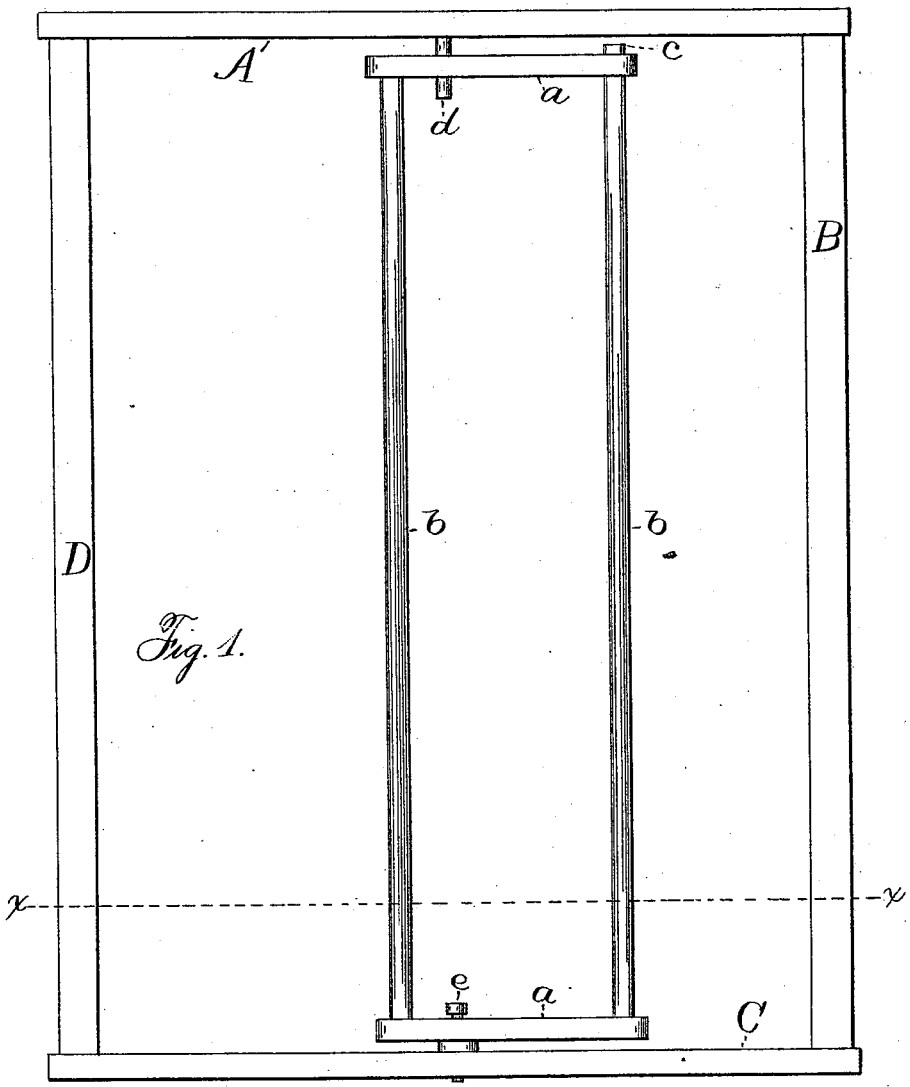
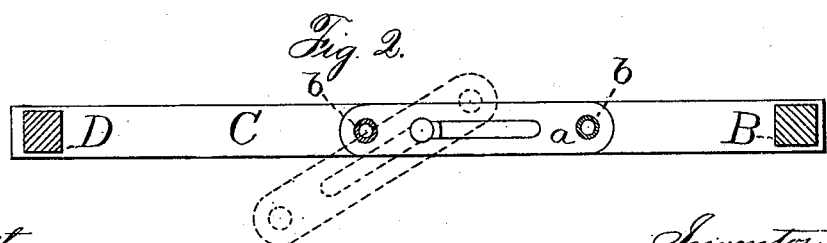
Witnesses
John Edwards Jr.
Edward Magnus
Inventor.
Mills H. Barnard.
By James Shepard
Att.
N. PETERS, PHOTO-LITHOGRAPHER, WASHINGTON, D C.

UNITED STATES PATENT OFFICE.

MILLS H. BARNARD, OF FORESTVILLE, CONNECTICUT, ASSIGNOR OF ONE-HALF TO ALVIN TAPLIN, OF SAME PLACE.

CATTLE-STANCHION.

SPECIFICATION forming part of Letters Patent No. 236,479, dated January 11, 1881.

Application filed October 21, 1880. (No model.)

*To all whom it may concern:*

Be it known that I, MILLS H. BARNARD, of Forestville, in the county of Hartford and State of Connecticut, have invented certain new and useful Improvements in Cattle-Stanchions, of which the following is a specification.

My invention relates to improvements in cattle-stanchions in which the neck-bars are hung in slotted cross-pieces, so as to swing freely and move laterally to the right and left of the animal; and the objects of my improvements are to afford greater ease and freedom of movement to the animal in certain directions, while at the same time it is as closely confined from stepping forward and backward as if the neck-bars were stationary. I attain these objects by the mechanism illustrated in the accompanying drawings, in which—

Figure 1 is a front elevation, and Fig. 2 a horizontal section on line *x x* of Fig. 1.

A B C D designate the frame-work, which may be of any ordinary construction. *a a* designate cross-pieces, slotted in the direction of their length, and to which the neck-bars *b b* are secured in any proper manner. As in ordinary stanchions, one of the neck-bars is made removable at one or both of its ends to admit the animal. I prefer to make these bars of hollow bars or pipes of iron; but they may be made of any suitable material. I secure the removable bar by pins at the ends, which take into the hollow ends of the bars. The upper pin, *c*, is lifted to free that end of the bar, when the bar can be lifted from the bottom pin, (which is not shown;) or, if desired, the bar might be hinged or hung at its lower end, and simply swing to one side; or they may be arranged to admit the animal in any ordinary manner. I secure the neck-bars *b b* and cross-pieces *a a* in the frame A B C D by means of pins *d e* in the bars A C of the frame. When thus mounted and the animal is confined therein the bars can move with the animal, so that it can turn its head and neck by reason of the swinging of the bars on the pins *d e*, and at the same time move its neck either to the right or left a distance equal to the length of the slot in the cross-pieces. This combined slotted and pivoted connection allows the animal not only to turn its head and neck freely, (which act will always have a tendency to move the bars laterally,) but to lie down without having its neck in the middle of the frame, and it may move its neck to either side at pleasure, so as to have it lie in a natural position with reference to its body. At the same time the animal is confined closely with reference to its stepping forward and backward, so that all the advantage of cleanliness which is gained by stationary neck-bars in a stanchion is obtained by the use of my stanchion.

In Fig. 2 the cross-piece is indicated in broken lines as well as in full lines, in order to show its range of movement.

I am aware that prior patents show stanchions with the neck-bars fixed in cross-pieces which swing upon a pivot without any lateral movement; also, one in which the swinging neck-bars are hung by a slotted connection, so that the lower end of the bars can move with the animal forward and back, but not directly to the right and left; and I hereby disclaim the same.

It is evident that the slots could, if desired, be made in the bars A C of the frame, and the pins *d e* firmly set in the middle of the cross-pieces *a a*, and the operation be precisely the same, the essential feature being the laterally-slotted connection of the pivoted cross-pieces and neck-bars, so that said bars slide directly to the right and left.

I claim as my invention—

The combination of the stanchion-frame with the pivoted neck-bars and cross-pieces having the longitudinal slots, so that the neck-bars are free to swing, and also to move directly to the right and left of the animal confined therein, substantially as described, and for the purpose specified.

MILLS H. BARNARD.

Witnesses:
WILLIAM E. BUNNELL,
LEVI STONE.